United States Patent

[11] 3,572,496

| [72] | Inventors | Ernest M. Cutts, Sr.; Ernest M. Cutts, Jr., R.D. 3, Vincentown, N.J. 08088 |
| [21] | Appl. No. | 792,354 |
| [22] | Filed | Jan. 21, 1969 |
| [45] | Patented | Mar. 30, 1971 |

[54] ADJUSTABLE ANGULATED CONVEYOR SYSTEM IN WHICH HOLDDOWN ROLLERS ARE EMPLOYED TO SECURE A RIDGED BELT TO CHANNELED PULLEYS
10 Claims, 4 Drawing Figs.

| [52] | U.S. Cl. | 198/109, 198/202 |
| [51] | Int. Cl. | B65g 41/00 |
| [50] | Field of Search | 198/203, 208, 91, 109, 184 |

[56] References Cited
UNITED STATES PATENTS

| 802,229 | 10/1905 | Moses | 198/109 |
| 889,959 | 6/1908 | O'Shaughnessy | 198/109X |
| 1,898,120 | 2/1933 | Farmer | 198/109X |
| 2,732,059 | 1/1956 | Erisman | 198/203 |
| 3,134,480 | 5/1964 | Loosli | 198/203X |

FOREIGN PATENTS

| 684,163 | 12/1952 | Great Britain | 198/203 |

Primary Examiner—Gerald M. Forlenza
Assistant Examiner—Frank E. Werner
Attorney—Morton C. Jacobs ABSTRACT: An angulated conveyor system is described in which a ridged conveyor belt is securely supported on channeled pulleys by holddown rollers. The frame of the conveyor is formed in a plurality of sections. The sections are pivotally connected to allow angular adjustment. A separate endless drive chain is provided in each section to permit angular adjustment without adjusting the tension on the chains.

Patented March 30, 1971
3,572,496
2 Sheets-Sheet 1
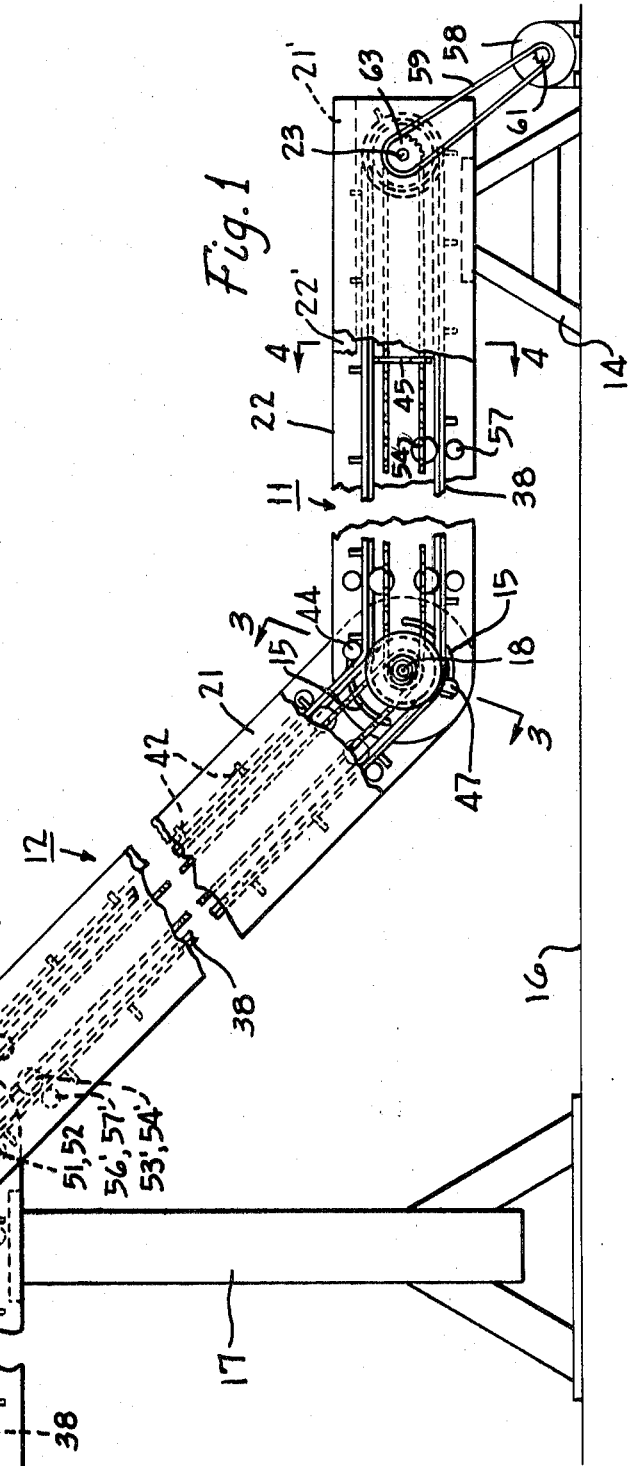
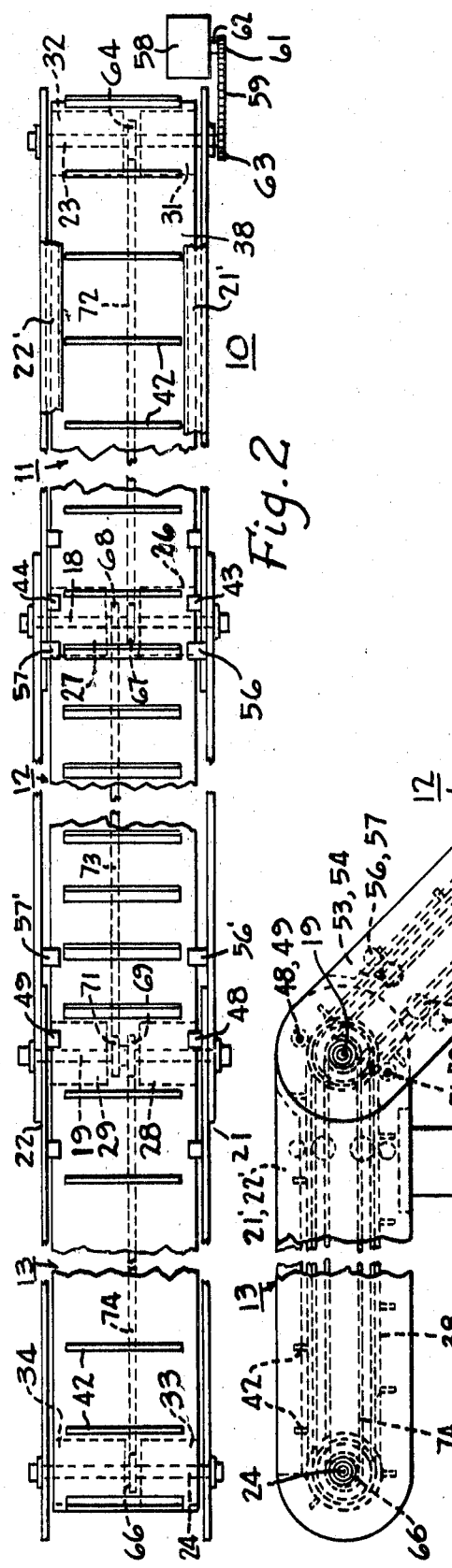
INVENTORS
ERNEST M. CUTTS, SR.
ERNEST M. CUTTS, JR.
BY
ATTORNEY Patented March 30, 1971
3,572,496
2 Sheets-Sheet 2
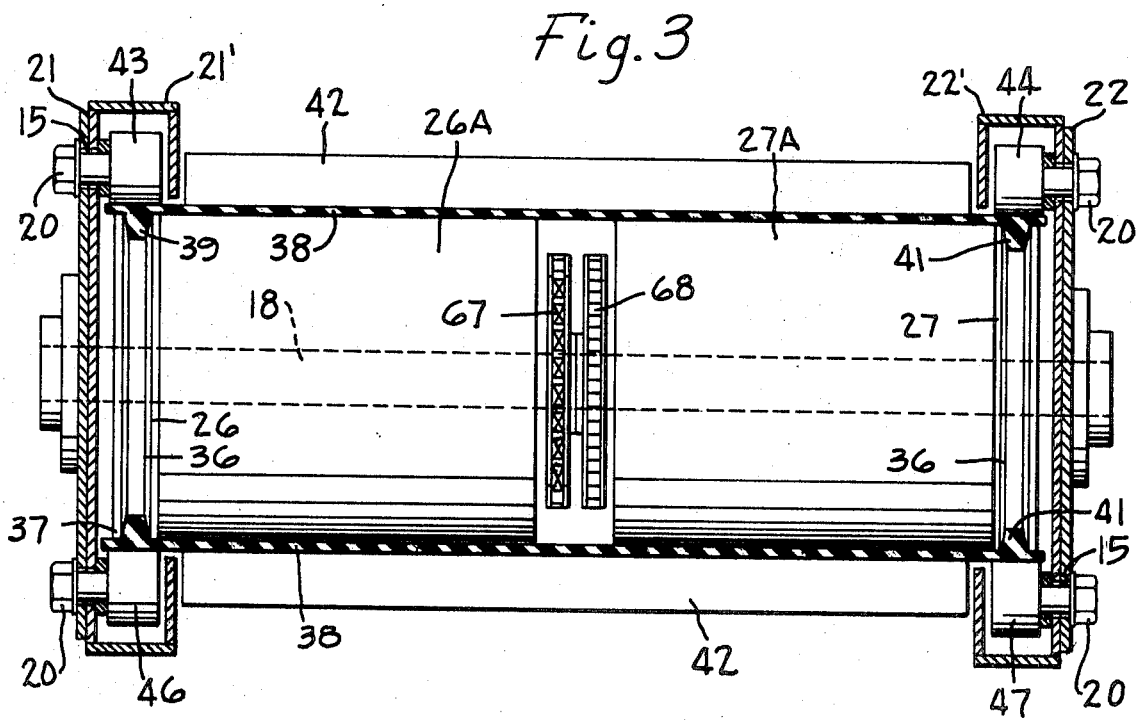
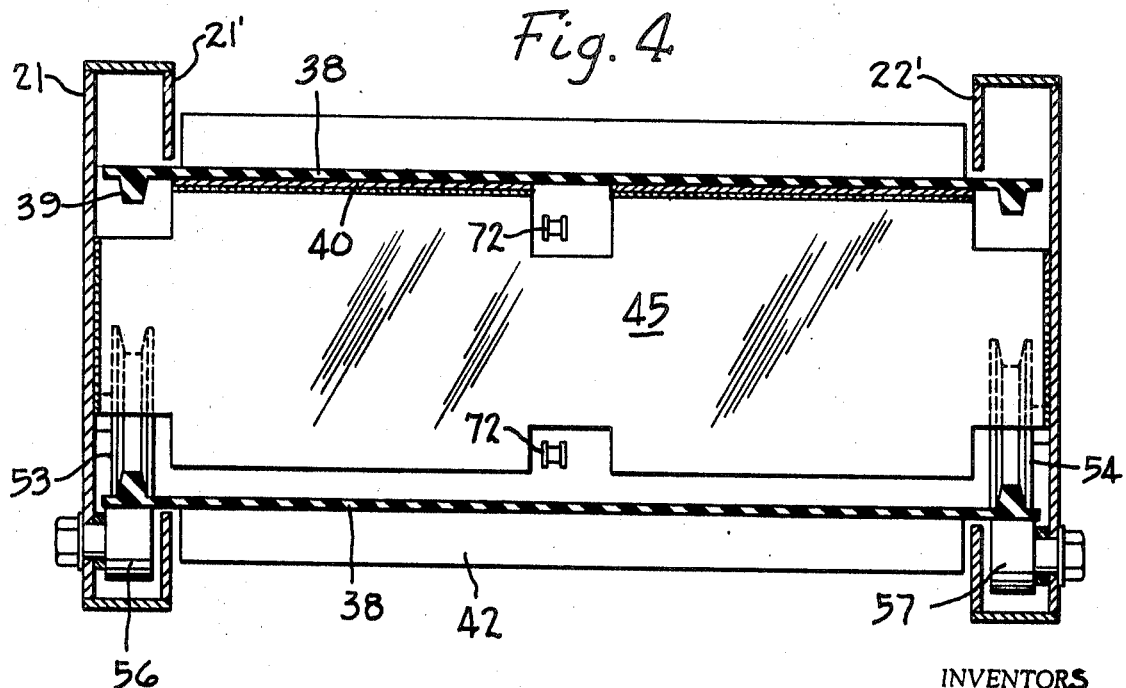
INVENTORS
ERNEST M. CUTTS, SR.
ERNEST M. CUTTS, JR.
BY
ATTORNEY

ADJUSTABLE ANGULATED CONVEYOR SYSTEM IN WHICH HOLDDOWN ROLLERS ARE EMPLOYED TO SECURE A RIDGED BELT TO CHANNELED PULLEYS

This invention relates to an angulated conveyor system, and particularly to an adjustable angulated conveyor system in which holddown rollers are employed to secure a ridged belt to channeled pulleys.

In conventional angulated conveyor systems, holddown rollers may be employed to secure a flexible conveyor belt to a support plate or wheel. These holddown rollers are positioned at the places where the belt traverses an angle to insure proper functioning of the belt through its angular travel.

It has been found that even when holddown rollers are employed the belt will buckle when loaded beyond a fixed capacity.

Many angulated conveyor systems are equipped with chain drives. Normally a chain or pair or chains is mounted on sprockets. Each chain is endless and runs the full length of the conveyor. If the angle of the conveyor is adjustable, the length of chain required for each angular setting is different. The slack in the chain must therefore be adjusted each time the angle of the conveyor is altered.

Therefore, it is an object of this invention to provide an improved angulated conveyor system.

It is a further object of this invention to provide an angulated conveyor system in which holddown rollers are employed to secure a ridged belt to channeled pulleys thereby increasing the loading capacity of the conveyor.

It is another object of this invention to provide an adjustable angulated conveyor system which required no major chain drive adjustment when the angle of the conveyor is altered.

With these and other objects in view, the present invention contemplates a system in which a ridged conveyor belt rides on mating channeled pulleys. The channeled pulleys are rotatably mounted on a frame adjacent holddown rollers. The holddown rollers are positioned to help secure the ridge on the conveyor belt in the channels of the pulleys.

In one embodiment the frame includes first and second sections. The first section is adjustably attached to the second section to provide an angle at an interface. A channeled drive pulley is mounted on a shaft rotatably secured to the frame at the angled interface. A pair of sprockets is mounted on the shaft. One sprocket carries a drive chain which rotates the shaft. The other sprocket carries a chain which transfers the drive to a second shaft which is rotatably mounted on the second section of the frame.

DESCRIPTION OF THE DRAWINGS

FIG. 1 is a broken side view partly cut away of an angulated conveyor system embodying the principles of this invention;

FIG. 2 is a top view of the system shown in FIG. 1, with parts cut away;

FIG. 3 is an enlarged sectional view taken along the line 3–3 of FIG. 1, showing details of the holddown and drive assemblies; and FIG. 4 is an enlarged sectional view taken along the line 4–4 of FIG. 1, showing other details of the conveyor construction.

DETAILED DESCRIPTION

An angulated conveyor system 10 having three sections 11, 12 and 13 is shown in FIGS. 1 and 2. The section 11 is supported by a stand 14 resting on a base 16. The section 13 supported by a stand 17 resting on the base 16. The angle assumed by the section 12 is determined by the height and positioning of the stands 14 and 17. It is understood that the stands 14 and 17 may rest on bases at different levels or that the sections may rest directly on bases without stands, and an extension of stand 14 or a separate stand may be used to support the other end of section 11. Clamping members may be employed to angularly secure the sections 11, 12 and 13 after adjustment is made. In this embodiment, a slot 15 is provided in each of the frame sections 11 and 12. Tightening clamp or lock nuts 20, which are used to mount conveyor rollers, secure the frame angle after adjustment is made.

At the interfaces formed by sections 11, 12 and 13, shafts 18 and 19 respectively are rotatably mounted between side frames 21 and 22 of the conveyor 10. A pair of shafts 23 and 24 are rotatably mounted between the side frames 21 and 22 at the far ends of the supported sections 11 and 13.

On each shaft 18, 19, 23 and 24 a pair of similarly constructed channeled pulleys 26 and 27, 28 and 29, 31 and 32, and 33 and 34 respectively are similarly mounted. For a detailed view see FIG. 3, where the pulleys 26 and 27 are mounted adjacent the ends of the shaft 18. In this embodiment each pulley, such as pulley 26, has a channel 36 along its outer peripheral edge 37 in the shape of a truncated V, and such pulleys are sometimes known as V-pulleys.

The pulleys 26 and 27 each have a cylindrical section 26A and 27A, respectively, extending therefrom along the shaft 18 to serve as a support roller for a conveyor belt.

An endless laminated rubber belt 38 (see FIGS. 1 and 3) encircles the pulleys on the shafts 18, 19, 23 and 24 to serve as the conveyor surface. The belt 38 has a pair of longitudinally running ridges 39 and 41 projecting from the inner surface thereof and extending continuously along the edges of the belt. These ridges mate with the channels, such as channel 36, in the pulleys 26, 27, 28, 29, 31, 32, 33 and 34. While the truncated V-shaped ridges and channels are preferable, it should be clear that the ridges and mating channels could be semicircular, rectangular or any other shape. On the outer surface of the belt 38 and projecting outwardly therefrom are a plurality of carrier bars 42 commonly employed in conveyor systems. A plurality of bearing plates 40 are mounted in the frame of the conveyor for top sections of the belt 38 to ride on. Plates 40 rest on spaced cross plates 45 and extend between the cylindrical pulley surfaces 26A and 27A of successive shafts, whereby the top section of the belt is substantially supported throughout its length.

At the interface between the sections 11 and 12 of the conveyor 10 (see FIG. 3), two pairs of holddown rollers are employed to secure the belt 38 to the pulleys 26 and 27. At the top of FIG. 3, holddown rollers 43 and 44 are mounted on the side frames 21 and 22, respectively, which have overhanging guard sections 21' and 22'. The holddown rollers 43 and 44 are mounted adjacent the outer peripheral edges of the pulleys 26 and 27 and rest against the outer surface of the belt 38 to urge the ridges 39 and 41 down into the respective channels 36. A pair of similarly constructed and arranged holddown rollers 46 and 47 are situated underneath the pulleys 26 and 27 and urge the return portion of the belt and the associated ridge portion into engagement with these pulleys.

A similar arrangement of holddown rollers is constructed at the interface between the sections 12 and 13. Referring to FIGS. 1 and 2, we see that holddown rollers 48 and 49 are employed at the upper surface of the belt and the top of pulleys 28 and 29, while holddown rollers 51 and 52 are employed at the under belt surface and the bottom of these pulleys.

No holddown rollers are required at the end pulleys 31, 32, 33 and 34 because the proper tensioning of the belt 38 will pull the ridges 39 and 41 into the pulley channels and retain them there.

Additional pulleys and rollers are spaced along the belt 38 to give additional support and for adjusting the tension in the belt after angular adjustment. See FIG. 4, for example, where smaller channeled idler pulleys 53 and 54 cooperate with rollers 56 and 57 respectively to prevent the underside of belt 38 from sagging. In addition, similar pairs of channeled pulleys 53', 54' and rollers 56', 57' are preferably located at the critical angulated regions of the belt 38, and particularly on each side of the large channeled pulleys 26, 27, 28, 29.

Drive is supplied to the conveyor belt 38 from a motor 58 shown in FIGS. 1 and 2. An endless chain 59 is driven by a sprocket 61 riding with a shaft 62 of the motor 58 to transfer power to a sprocket 63 which is on the shaft 23 and which drives that shaft. Each of the end shafts 23 and 24 has one transmission sprocket 64 and 66 respectively attached thereto between their respective channeled pulleys. The shafts 18 and 19 located at the angular interfaces each carry two transmission sprockets 67 and 68, and 69 and 71 respectively.

An endless chain 72 engages the sprockets 64 and 67 and transmits power from the former to the latter. Endless chains 73 and 74 engage sprockets 68 and 71, and 69 and 66 respectively, and relay the power transmission. In this way drive from the motor is transmitted successively to the shafts 23, 18, 19, and 24, in that order. It should be noted that by using separate chains for each of the straight sections 11, 12 and 13, a drive system has been provided which is insensitive to the angular position of the conveyor 10. If a single chain had been employed to drive all the shafts 18, 19, 23 and 24, the length of chain contacting each sprocket at each angular adjustment of the conveyor 10 would be different, requiring a tensioning adjustment on the chain.

In operation the motor 58 turns shaft 62 driving sprocket 61. The sprocket 61 drives chain 59 which rotates sprocket 63 and shaft 23. The chains 72, 73 and 74 cooperate with sprockets 64, 67, 68, 71, 69 and 62 to rotate the shafts 18, 19 and 24. The rotating shafts 18, 19, 23 and 24 drive the channeled pulleys 26 through 29 and 31 through 34 which in turn drive the contacting ridged conveyor belt 38. The holddown rollers 43, 44, 46 through 49, 51 and 52 ride on the conveying surface of the belt 38 holding the ridges 39 and 41 in the channels of the pulleys.

The adjustable conveyor as described may be employed in any materials handling applications. For example, the conveyor has been found advantageous for loading harvested agricultural products onto trucks.

It should be understood that the above-described embodiment is merely illustrative of the principles of this invention and many other embodiments can be devised without departing from the spirit and scope thereof. For example, various other materials may be used for conveyor belt; plastics, fabrics, leather, and neoprene are suitable materials.

We claim:

1. An angulated conveyor apparatus including:
   a frame having an angulated portion between a plurality of sections;
   a laterally flexible, endless conveyor belt having a conveying surface;
   means including a plurality of spaced belt-supporting wheels rotatably mounted on said frame adjacent said angulated portion for mounting said conveyor belt on said frame to form an angle at said wheels and for movement from a first belt-supporting position on one of said frame sections to said belt-supporting wheels and therefrom to a second belt-supporting position on another of said sections;
   said belt-supporting wheels and said conveyor belt having mating surfaces for preventing lateral movement of said belt, said wheel surfaces extending around said wheels, and said belt surfaces extending along a surface of said belt opposite to said conveying surface; and
   holddown rollers mounted on said frame and having peripheral surfaces in contact with portions of said conveying surface opposite to said belt-mating surfaces for maintaining engagement of the mating surfaces of said wheels and belt; whereby said belt is longitudinally angulated at said wheels between sections corresponding to said frame sections, and said engaged wheel and belt surfaces tend to maintain said flexible belt laterally extending between said wheels.

2. An angulated conveyor apparatus as recited in claim 1 wherein said mating surfaces include longitudinally extending ridges and channels on said belt and wheels.

3. An angulated conveyor apparatus as recited in claim 2 wherein said conveyor belt has a driving surface opposite said conveying surface, and said ridges project from said driving surface adjacent the side edges thereof.

4. An angulated conveyor apparatus as recited in claim 3 wherein said belt-supporting wheels are pulleys having said channels in the peripheries thereof.

5. An angulated conveyor apparatus as recited in claim 4 wherein said ridges and channels have truncated V-shaped cross sections.

6. An angulated conveyor apparatus as recited in claim 1 wherein said belt includes a plurality of spaced carrier portions projecting from said conveying surface and each extending laterally between said conveying surface portions in contact with said holddown rollers.

7. An angulated conveyor apparatus as recited in claim 1 and further comprising means mounted on said frame for driving said belt longitudinally, said belt driving means including separate endless chains associated with each of said belt sections, and sprocket wheel means rotatably mounted on said frame adjacent said angulated frame portion for intercoupling said chains to drive one of said chains with another thereof; whereby said chains are generally independent of the angle of said belt.

8. An angulated conveyor apparatus as recited in claim 7 wherein said belt-driving means further includes:
   a first shaft on which said sprocket wheel means and belt-supporting wheels are mounted;
   a second and a third shaft at said first and second belt-supporting positions respectively on said one and another frame sections, and separate sprocket wheel means and separate additional ones of said belt-supporting wheels mounted on said second and third shafts; and
   one of said chains being connected between the sprocket means on said first and second shafts, and another of said chains being connected between the sprocket means on said first and third shafts.

9. An angulated conveyor apparatus as recited in claim 8 wherein said belt driving means further includes cylindrical pulley means mounted on said shafts in contact with said belt.

10. An angulated conveyor apparatus as recited in claim 8 wherein said frame sections are pivotally connected at said first shaft for adjustment of the belt angle.